Patented Mar. 24, 1942

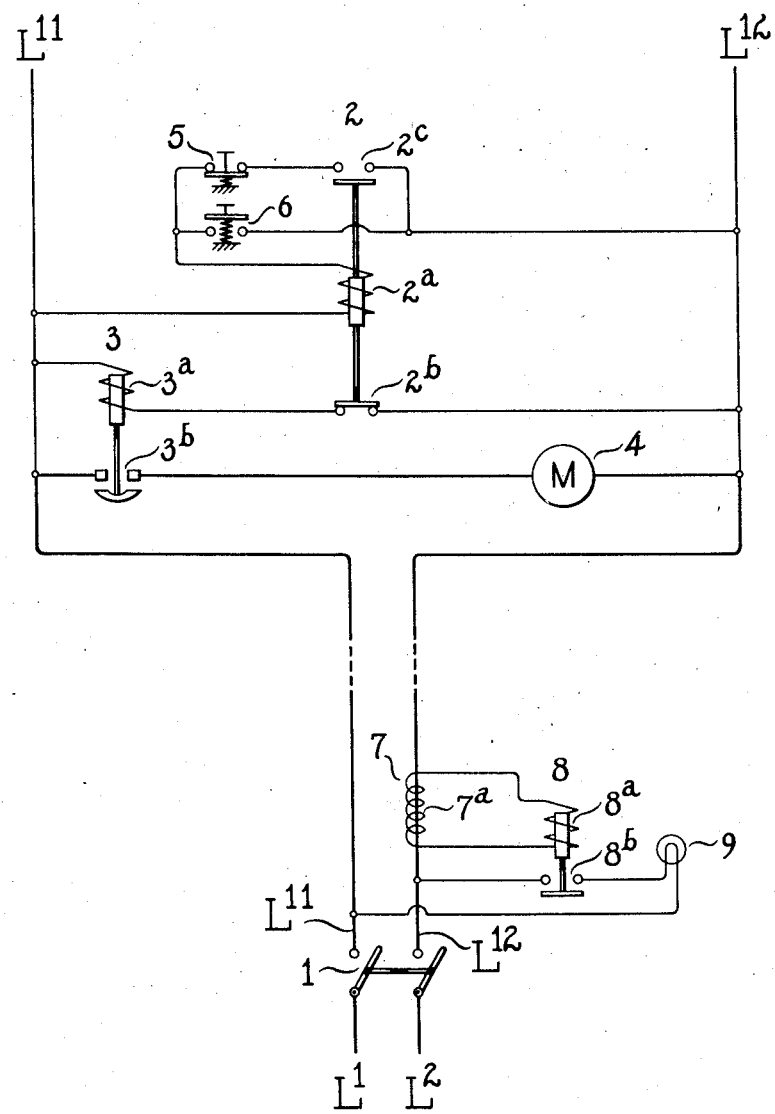

2,277,578

UNITED STATES PATENT OFFICE 2,277,578

SYSTEM OF MOTOR CONTROL

George E. Booth, St. Louis, Mo., assignor to Cutler-Hammer, Inc., Milwaukee, Wis., a corporation of Delaware Application December 26, 1940, Serial No. 371,797

11 Claims. (Cl. 172—239)

This invention relates to a system of motor control, and is particularly applicable to installations where a motor is located at a point considerably distant from the supply station, and is to be controlled either from a point adjacent to the motor or from the supply station.

In certain air conditioning, heating and/or ventilating installations, and in certain oil field pumping systems and the like, it is required that provision be made for starting and stopping of the driving motors from the power distribution center, or control station, while at the same time providing for starting and stopping of the motor individually (as for inspection or repair of the respective devices) at points adjacent to the several motors. Heretofore it has been the practice to provide push-button control stations at the respective motor locations and a corresponding number of push-button control stations at the central control station or power distribution center, with a correspondingly large number of sets of control wires between the respective pairs of push-button stations.

A primary object of my invention is to provide a controller which permits the selective control of a motor or motors either from the point of installation or from the point of power supply without the necessity for separate control wires between the distant points.

Another object is to provide a controller which permits the starting and stopping of a motor selectively either from the supply station or from the point of installation, whereby, however, preference is given under certain conditions to the control from the supply station.

Another object is to provide adjacent to the supply station of a system of the aforementioned character indicating means which indicate the operation or inoperation of the motor, or motors, regardless of the point from which the motor or motors have been controlled.

Another and more specific object is to provide for location of such indicating means adjacent to the supply station without necessitating use of any additional wires between the motor or motors and the supply station.

Other object and advantages will hereinafter appear.

The accompanying drawing illustrates schematically and diagrammatically a system embodying the invention as applied to the control of a single phase alternating current motor. Power is supplied from the lines $L^1$ and $L^2$ through a control switch or circuit breaker 1, which may be of any desired type, to the bus bars $L^{11}$ and $L^{12}$, respectively, which carry the current from the supply station to the point at which the motor is located.

The motor controller which is installed adjacent to the motor comprises a relay 2, having an operating winding $2^a$, normally closed contacts $2^b$, and normally open contacts $2^c$. The controller further includes an electromagnetic switch 3 having an operating winding $3^a$ and normally open contacts $3^b$. A motor 4 is connected in a circuit extending from $L^{11}$ through contacts $3^b$, when closed, through the motor to $L^{12}$. The controller also includes a normally closed start push-button 5 and a normally open stop push-button 6.

A circuit extends from line $L^1$ through switch 1, bus $L^{11}$, operating winding $3^a$ and contact $2^b$, when closed, to bus $L^{12}$ and thence to line $L^2$. A further circuit extends from $L^{11}$, when energized, through winding $2^a$ over contacts 6, when closed, to $L^{12}$, and alternately over contacts 5 and $2^c$, when closed, to $L^{12}$—thus providing a maintaining circuit for said winding $2^a$.

Adjacent to the power supply station or central control point (as represented by switch 1) I prefer to install current transformer 7 whose primary winding (not shown) is connected in series with the bus $L^{12}$, while its secondary winding $7^a$ is connected in series with a winding $8^a$ of a relay 8, having normally open contacts $8^b$. An indicating lamp 9 is connected in a circuit extending from $L^{11}$ through the lamp 9, contacts $8^b$, to $L^{12}$ so that the lamp is lighted when the relay 8 is energized upon flow of a predetermined value of current through the bus $L^{12}$. Thus if the motor is taking energy from the supply, the relay 8 is energized and the lamp 9 is bright, indicating that the motor is running.

When the switch 1 is closed (the relay 2 being in its normally deenergized position, so that contacts $2^b$ are closed) an energizing circuit will be completed for the operating winding $3^a$ of switch 3—thus effecting closure of the normally open contacts $3^b$ to complete the energizing motor 4. If it is now desired to stop the motor 4 at the power supply station it is only necessary to open the switch 1; but if it should be desired to stop the motor at the point adjacent to motor 4, the operator pushes the stop button 6, thereby completing a circuit through the operating winding $2^a$ of relay 2, to energize the relay, with consequent opening of the contacts $2^b$. This in turn deenergizes the operating winding $3^a$ of switch 3 and opens the contacts 3b to interrupt the supply of energy to the motor 4.

Energization of relay 2 also closes the normally open contacts 2c, so that the operating winding 2a of said relay will be maintained energized by a circuit including contacts 5 and 2c, thus also maintaining the switch 3 and the motor 4 deenergized.

If the operator at the point adjacent to the motor 4 again desires to energize the same, he presses the button 5 thereby interrupting the maintaining circuit of the operating winding 2a of relay 2, with consequent closing of contacts 2b to complete the energizing circuit of the operating winding 3a of switch 3, which in turn closes its contacts 3b to complete the motor circuit. Of course, after motor 4 has been stopped by pressing the button 6 at the point adjacent thereto, in the manner aforedescribed, it is also possible to restart the motor 4 at the power supply station through the medium of switch 1, by merely opening said switch and reclosing it; whereupon the motor 4 starts in the manner aforedescribed.

If it is desired to prevent restarting of motor 4 by closure, or by opening and reclosure, of switch 1, a disconnect switch (not shown) may be included in the motor circuit, so that upon opening of the disconnect switch at a point adjacent to the motor the inspector or maintenance man will be protected.

I claim:

1. In a system for supplying power to a translating circuit and for controlling said circuit from a plurality of control points located at a distance from each other, the combination of a switch for connecting to a source of energy a branch circuit adapted to supply said translating circuit, an electromagnetic switch having an operating winding and a normally open contact adapted when closed to connect said translating circuit to said branch circuit, an electromagnetic relay having an operating winding, a normally closed contact adapted to connect said first mentioned operating winding to said branch circuit, and a normally open contact, a control switch biased to open position and adapted upon closure to connect said relay winding to said branch circuit, and a control switch biased to closed position and connected in series with said normally open relay contact to provide upon closure of the latter for paralleling of said first mentioned control switch.

2. In a system for supplying power to a translating circuit and for controlling said circuit from a plurality of control points located at a distance from each other, the combination of a switch for connecting to a source of energy a branch circuit adapted to supply said translating circuit, an electromagnetic switch adapted to normally connect said translating circuit to receive energy when said branch circuit is energized, and additional means operable at will to selectively control said electromagnetic switch to disconnect said translating circuit from and thereafter to reconnect the same to said branch circuit during energization of the latter.

3. In a system for supplying power to a translating circuit and for controlling said circuit from a plurality of control points located at a distance from each other, the combination of a switch for connecting to a source of energy a branch circuit adapted to supply said translating circuit, an electromagnetic switch adapted to normally connect said translating circuit to receive energy when said branch circuit is energized, additional means operable at will to selectively control said electromagnetic switch to disconnect said translating circuit from and thereafter to reconnect the same to said branch circuit during energization of the latter, and means including said electromagnetic switch to provide for connection of said translating circuit to said branch circuit upon reestablishment of energization of said branch circuit subsequent to interruption thereof, regardless of prior operation of said additional means to disconnect said translating circuit.

4. In a system for supplying power to a translating circuit and controlling said circuit from a plurality of control points located at a distance from each other, the combination of a switch for connecting to a source of energy a branch circuit adapted to supply said translating circuit, an electromagnetic switch normally energized to thereby connect said translating circuit to receive energy from said branch circuit, and selective means adapted to be supplied with energy from said branch circuit, said last mentioned means being operable to deenergize said electromagnetic switch and to reenergize it when said branch circuit is energized, and said last mentioned means being arranged to provide for energization of said electromagnetic switch upon energization of said branch circuit subsequent to deenergization thereof.

5. In a system for supplying power to a translating circuit and controlling said circuit from a plurality of control points located at a distance from each other, the combination of a switch for connecting to a source of energy a branch circuit adapted to supply said translating circuit, an electromagnetic switch having an operating winding and a normally open contact adapted when closed to connect said translating circuit to said branch circuit, an electromagnetic relay having an operating winding, a normally closed contact adapted to connect said first mentioned operating winding to said branch circuit, and a normally open contact, a push-button switch biased to open position and adapted upon closure to connect said relay winding to said branch circuit, and a push-button switch biased to closed position and connected in series with said normally open contact of said relay to shunt said first mentioned push-button switch upon operating energization of said relay, and to deenergize said relay upon operation of said last mentioned push-button switch.

6. In a system for supplying power to a translating circuit and controlling said circuit from a plurality of control points located at a distance from each other, the combination of a switch for connecting to a source of energy a branch circuit adapted to supply said translating circuit, an electromagnetic switch having an operating winding and a normally open contact adapted when closed to connect said translating circuit to said branch circuit, an electromagnetic relay having an operating winding, a normally closed contact adapted to connect said first mentioned operating winding to said branch circuit, and a normally open contact, a control switch biased to open position and adapted upon closure to connect said relay winding to said branch circuit, a control switch biased to closed position and connected in series with said normally open relay contact to provide upon closure of the latter for paralleling of said first mentioned control switch, and associated means responsive to the current in said branch circuit and adapted to indicate the operative and inoperative conditions of the translating circuit.

7. In a system for supplying power to a translating circuit and controlling said circuit from a plurality of control points located at a distance from each other, the combination of a switch for connecting to a source of energy a branch circuit adapted to supply said translating circuit, an electromagnetic switch having an operating winding and a normally open contact adapted when closed to connect said translating circuit to said branch circuit, an electromagnetic relay having an operating winding, a normally closed contact adapted to connect said first mentioned operating winding to said branch circuit, and a normally open contact, a control switch biased to open position and adapted upon closure to connect said relay winding to said branch circuit, a control switch biased to closed position and connected in series with said normally open relay contact to provide upon closure of the latter for paralleling of said first mentioned control switch, and a relay connected to said branch circuit and responsive to the operating current of said translating circuit to indicate its operating condition.

8. In a system for supplying power to a translating circuit and controlling said circuit from a plurality of control points located at a distance from each other, the combination of a switch for connecting to a source of energy a branch circuit adapted to supply said translating circuit, an electromagnetic switch having an operating winding, a normally closed contact adapted to connect said first mentioned operating winding to said branch circuit, and a normally open contact, a control switch biased to open position and adapted upon closure to connect said relay winding to said branch circuit, a control switch biased to closed position and connected in series with said normally open relay contact to provide upon closure of the latter for paralleling of said first mentioned control switch, a current transformer having its primary winding connected in series with said branch circuit, and an electromagnetic relay having an operating winding connected in circuit with a secondary winding of said transformer and adapted to control the supply of current to an indicator to indicate the operating condition of said translating circuit.

9. In a system of motor control, in combination, an electric driving motor located at a given point and a central power supply station located at a point distant from said motor, power supply lines extending from said central station to said motor, a switch adjacent to said central station, said switch being adapted when closed or opened at will to respectively energize or deenergize said supply lines, an electromagnetically operable switch located adjacent to said motor, said last mentioned switch having an operating winding and normally open contacts adapted when closed to complete the energizing circuit of the motor, an electromagnetically operable relay also located adjacent to said motor, said relay having normally closed and normally open contacts, said normally closed contacts being included in circuit with the operating winding of said electromagnetically operable switch to normally provide for completion of the energizing circuit of said motor upon closure of said first mentioned switch after opening of the latter, and a push-button station also located adjacent to said motor and operable at will to effect energization or deenergization of said relay winding, with consequent interruption or completion of said motor circuit, at any time during closure of said first mentioned switch.

10. In a system of motor control, in combination, an electric driving motor located at a given point and a central power supply station located at a point distant from said motor, power supply lines extending from said central station to said motor, a switch adjacent to said central station, said switch being adapted when closed or opened at will to respectively energize or deenergize said supply lines, an electromagnetically operable switch located adjacent to said motor, said last mentioned switch having an operating winding and normally open contacts adapted when closed to complete the energizing circuit of the motor, an electromagnetically operable relay also located adjacent to said motor, said relay having normally closed and normally open contacts, said normally closed contacts being included in circuit with the operating winding of said electromagnetically operable switch to normally provide for completion of the energizing circuit of said motor upon closure of said first mentioned switch after opening of the latter, a push-button station also located adjacent to said motor and operable at will to effect energization or deenergization of said relay winding, with consequent interruption or completion of said motor circuit, at any time during closure of said first mentioned switch, and said first mentioned switch being adapted upon opening thereof to insure deenergization of the operating winding of said relay with consequent closure of the normally closed contacts of the latter, whereby upon reclosure of said first mentioned switch the energizing circuit of said motor will be completed independently of said push-button station.

11. In a system of motor control, in combination, an electric driving motor located at a given point and a central power supply station located at a point distant from said motor, power supply lines extending from said central station to said motor, a switch adjacent to said central station, said switch being adapted when closed or opened at will to respectively energize or deenergize said supply lines, an electromagnetically operable switch located adjacent to said motor, said last mentioned switch having an operating winding and normally open contacts adapted when closed to complete the energizing circuit of the motor, an electromagnetically operable relay also located adjacent to said motor, said relay having normally closed and normally open contacts, said normally closed contacts being included in circuit with the operating winding of said electromagnetically operable switch to normally provide for completion of the energizing circuit of said motor upon closure of said first mentioned switch after opening of the latter, a push-button station also located adjacent to said motor and operable at will to effect energization or deenergization of said relay winding, with consequent interruption or completion of said motor circuit, at any time during closure of said first mentioned switch, said first mentioned switch being adapted upon opening thereof to insure deenergization of the operating winding of said relay with consequent closure of the normally closed contacts of the latter, whereby upon reclosure of said first mentioned switch the energizing circuit of said motor will be completed independently of said push-button station, a relay located adjacent to said central station and having an operating winding inductively related to the power supply lines of said motor and responsive to a predetermined value of current incident to completion of the motor circuit, said last mentioned relay having normally open contacts adapted when closed to complete the circuit of an indicating lamp or the like, to thereby indicate to the central station operator the condition of operation or inoperation of said motor at said distant point.

GEORGE E. BOOTH.